(12) United States Patent
Battagin et al.

(10) Patent No.: US 7,991,804 B2
(45) Date of Patent: Aug. 2, 2011

(54) METHOD, SYSTEM, AND APPARATUS FOR EXPOSING WORKBOOKS AS DATA SOURCES

(75) Inventors: Daniel C. Battagin, Redmond, WA (US); Liviu Asnash, Redmond, WA (US); Shahar Prish, Redmond, WA (US); Eran Megiddo, Bellevue, WA (US); Amir Netz, Bellevue, WA (US); Cristian Petculescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 97 days.

(21) Appl. No.: 10/903,568

(22) Filed: Jul. 30, 2004

(65) Prior Publication Data

US 2006/0024653 A1   Feb. 2, 2006

(51) Int. Cl.
*G06F 7/00* (2006.01)
*G06F 17/30* (2006.01)
*G06F 17/00* (2006.01)

(52) U.S. Cl. .................. 707/804; 707/758; 707/600

(58) Field of Classification Search ............. 707/3, 4, 707/100–102, 804, 758, 600, 803, 802, 790, 707/705

See application file for complete search history.

(56) References Cited

U.S. PATENT DOCUMENTS

| | | | |
|---|---|---|---|
| 4,912,657 A | 3/1990 | Saxton et al. | |
| 5,033,009 A | 7/1991 | Dubnoff | |
| 5,371,675 A | 12/1994 | Greif et al. | |
| 5,437,006 A | 7/1995 | Turski | |
| 5,721,847 A | 2/1998 | Johnson | |
| 5,832,532 A | 11/1998 | Kennedy et al. | |
| 5,890,174 A | 3/1999 | Khanna et al. | |
| 5,893,123 A | 4/1999 | Tuinenga | |
| 5,926,822 A | 7/1999 | Garman | |
| 5,933,818 A | 8/1999 | Kasravi et al. .................. 706/12 |
| 5,937,406 A * | 8/1999 | Balabine et al. .............. 707/100 |
| 5,966,716 A | 10/1999 | Comer et al. | |
| 5,974,416 A | 10/1999 | Anand et al. | |
| 5,983,268 A | 11/1999 | Freivald et al. | |
| 6,009,455 A | 12/1999 | Doyle | |
| 6,012,057 A | 1/2000 | Mayer et al. ...................... 707/6 |
| 6,055,548 A | 4/2000 | Comer et al. | |
| 6,094,651 A | 7/2000 | Agrawal et al. | |
| 6,122,649 A | 9/2000 | Kanerva et al. | |
| 6,157,934 A | 12/2000 | Khan et al. | |

(Continued)

FOREIGN PATENT DOCUMENTS

CN    200510089652.8    10/2009

(Continued)

OTHER PUBLICATIONS

4tops.com, "Excel Import Assistant for Microsoft Access" Apr. 2003, www.4tops.com.*

(Continued)

*Primary Examiner* — Brent Stace
(74) *Attorney, Agent, or Firm* — Merchant & Gould

(57) ABSTRACT

A method, system, and apparatus are provided for exposing and utilizing workbooks as server data sources. The system includes a client computer capable of executing a spreadsheet application program for creating a workbook including one or more worksheets. The workbook may be published to a server computer where the contents of the workbook are exposed as a multi-dimensional data source. The server computer allows client applications to discover and connect to the workbook as a multi-dimensional, data source, such as a cube.

18 Claims, 6 Drawing Sheets

U.S. PATENT DOCUMENTS

| | | | |
|---|---|---|---|
| 6,269,377 B1 | 7/2001 | Collie et al. | |
| 6,317,750 B1 | 11/2001 | Tortolani et al. | 707/4 |
| 6,411,313 B1* | 6/2002 | Conlon et al. | 715/769 |
| 6,430,584 B1 | 8/2002 | Comer et al. | |
| 6,446,059 B1 | 9/2002 | Berger et al. | |
| 6,456,999 B1 | 9/2002 | Netz | |
| 6,473,750 B1 | 10/2002 | Petculescu et al. | |
| 6,477,536 B1 | 11/2002 | Pasumansky et al. | |
| 6,490,600 B1 | 12/2002 | McGarry | |
| 6,493,718 B1 | 12/2002 | Petculescu et al. | |
| 6,532,458 B1 | 3/2003 | Chaudhuri et al. | |
| 6,549,907 B1 | 4/2003 | Fayyad et al. | |
| 6,604,135 B1* | 8/2003 | Rogers et al. | 709/217 |
| 6,613,098 B1 | 9/2003 | Sorge et al. | |
| 6,631,497 B1 | 10/2003 | Jamshidi et al. | |
| 6,632,249 B2 | 10/2003 | Pollock | |
| 6,684,206 B2 | 1/2004 | Chen et al. | |
| 6,691,281 B1 | 2/2004 | Sorge et al. | |
| 6,701,485 B1 | 3/2004 | Igra et al. | |
| 6,779,151 B2 | 8/2004 | Cahill et al. | |
| 6,898,603 B1* | 5/2005 | Petculescu et al. | 707/101 |
| 6,920,443 B1 | 7/2005 | Cesare et al. | |
| 6,944,662 B2 | 9/2005 | Devine et al. | |
| 6,988,241 B1 | 1/2006 | Guttman et al. | |
| 7,013,246 B1 | 3/2006 | Gerlovin et al. | |
| 7,032,030 B1 | 4/2006 | Codignotto | 709/246 |
| 7,082,569 B2 | 7/2006 | Voshell | |
| 7,177,855 B2 | 2/2007 | Witkowski et al. | |
| 7,185,279 B2 | 2/2007 | Machalek | |
| 7,222,294 B2 | 5/2007 | Coffen et al. | |
| 7,233,956 B2 | 6/2007 | Balducci et al. | |
| 7,240,052 B2 | 7/2007 | Sidlosky et al. | 707/3 |
| 7,251,776 B2 | 7/2007 | Handsaker et al. | |
| 7,266,763 B2 | 9/2007 | Peyton-Jones et al. | |
| 7,299,223 B2 | 11/2007 | Namait et al. | |
| 7,530,012 B2 | 5/2009 | Medicke et al. | |
| 7,664,804 B2 | 2/2010 | Battagin et al. | 707/804 |
| 7,761,403 B2 | 7/2010 | Witkowski et al. | |
| 2002/0010743 A1 | 1/2002 | Ryan et al. | |
| 2002/0013786 A1 | 1/2002 | Machalek | |
| 2002/0059261 A1 | 5/2002 | Pollock | |
| 2002/0095399 A1 | 7/2002 | Devine et al. | |
| 2002/0169799 A1* | 11/2002 | Voshell | 707/503 |
| 2002/0188629 A1 | 12/2002 | Burfoot | |
| 2003/0110191 A1 | 6/2003 | Handsaker et al. | |
| 2003/0149934 A1* | 8/2003 | Worden | 715/513 |
| 2003/0195762 A1 | 10/2003 | Gleason et al. | |
| 2004/0060001 A1 | 3/2004 | Coffen et al. | |
| 2004/0103365 A1* | 5/2004 | Cox | 715/503 |
| 2004/0103366 A1 | 5/2004 | Peyton-Jones et al. | |
| 2004/0133567 A1* | 7/2004 | Witkowski et al. | 707/3 |
| 2004/0133568 A1* | 7/2004 | Witkowski et al. | 707/3 |
| 2004/0237029 A1* | 11/2004 | Medicke et al. | 715/503 |
| 2005/0039113 A1 | 2/2005 | Balducci et al. | 715/503 |
| 2005/0039114 A1* | 2/2005 | Naimat et al. | 715/503 |
| 2005/0267853 A1 | 12/2005 | Netz et al. | |
| 2006/0112123 A1* | 5/2006 | Clark et al. | 707/101 |
| 2009/0235154 A1 | 9/2009 | Khen et al. | |

FOREIGN PATENT DOCUMENTS

| | | |
|---|---|---|
| EG | 23841 | 10/2007 |
| EP | 0 997 834 A2 | 5/2000 |
| EP | 1 605 367 A2 | 12/2005 |
| JP | 2000-067143 | 3/2000 |
| JP | 2001-243242 | 9/2001 |
| NZ | 540421 | 3/2007 |
| PH | 1-2005-000275 | 7/2010 |
| RU | 2174256 C2 | 9/2001 |
| RU | 2213369 C2 | 9/2003 |
| RU | 2002118306 A | 2/2004 |
| RU | 36 541 U1 | 3/2004 |
| SG | 117588 | 4/2008 |
| ZA | 200504159 (A) | 8/2006 |

OTHER PUBLICATIONS

ExcelTip.com "Export data from Excel to Access (DAO) using VBA in Mircosoft Excel" May 2003, ExcelTip.com, pp. 1-2.*

Witkowski, Andrew, et al., "Spreadsheets in RDBMS for OLAP" Jun. 2003, ACM SIGMOD, p. 52-63.*

European Search Report dated Jun. 30, 2006 (for Application No. 05104477.4-2201).

Lakshmanan et al., "On Querying Spreadsheets," Data Engineering, 1998, Proceedings, 14$^{th}$ International Conference, pp. 134-141.

De Paoli et al., "Requirements for a Layered Software Architecture Supporting Cooperative Multi-Layer Interaction," Software Engineering, 1996, Proceedings of the 18$^{th}$ International Conference, pp. 408-417.

U.S. Final Office Action dated Sep. 24, 2007 cited in U.S. Appl. No. 10/858,175.

U.S. Appl. No. 10/903,781, filed Jul. 30, 2004 entitled "Method, System, and Apparatus for Providing Access to Workbook Models Through Remote Function Calls".

European Search Report dated Jul. 30, 2007 cited in EP Application No. 05104620.9-1243.

European Official Communication dated Nov. 5, 2007 cited in EP Application No. 05 104 620.9-1243.

U.S. Office Action dated Oct. 30, 2006 cited in U.S. Appl. No. 10/858,175.

U.S. Office Action dated Oct. 31, 2007 cited in U.S. Appl. No. 10/903,781.

U.S. Final Office Action dated May 12, 2008 cited in U.S. Appl. No. 10/903,781.

U.S. Office Action dated May 23, 2008 cited in U.S. Appl. No. 10/858,175.

U.S. Final Office Action dated Nov. 14, 2008 cited in U.S. Appl. No. 10/858,175.

Chinese Second Office Action dated Nov. 21, 2008 cited in Application No. 200510082420.X.

Chinese First Office Action dated Feb. 13, 2009 cited in Application No. 200510082407.4.

Chinese Third Office Action dated Mar. 13, 2009 cited in Application No. 200510082420.X.

U.S. Office Action dated Apr. 3, 2009 cited in U.S. Appl. No. 10/858,175.

Mexican Office Action dated Jan. 22, 2009 cited in Application No. PA/a/2005/005799.

Chinese Fourth Office Action dated Jul. 10, 2009 cited in Application No. 200510082420.X.

U.S. Office Action dated Nov. 26, 2008 cited in U.S. Appl. No. 10/903,781.

U.S. Final Office Action dated Aug. 4, 2009 cited in U.S. Appl. No. 10/903,781.

European Official Communication dated Nov. 26, 2009 cited in EP Application No. 05 105 620.9-1243.

Erik Hatcher, "Remote scripting using a servlet," Jan. 2, 2001, http://www.ibm.com/developerworks/web/library/wa-resc/, 7 pgs.

Australian Examiner's First Office Action dated Feb. 15, 2010 cited in Application No. 2005202285.

Russian Official Action dated May 15, 2009 cited in Application No. 2005116530/09(018863).

European Examination Report dated Mar. 1, 2007 cited in Application No. 05104477.4-2201.

Chinese First Office Action dated Mar. 14, 2008 cited in Application No. 200510082420.X.

Russian Office Action dated Dec. 23, 2009 cited in Application No. 2005116530/09(018863).

Mexican Office Action dated May 7, 2010 cited in Application No. PA/a/2005/005799.

Chinese Third Office Action dated May 12, 2010 cited in Application No. 200510082407.4.

Russian Decision on Grant dated Jun. 21, 2010 cited in Application No. 2005116530/09(018863).

Pershikov, V.I. et al., "Dictionary of Computer Science", Moscow, Finance and Statistics Publishers, 1991, p. 66, first column, 4 pp.

Person, R., Microsoft Excel 97 in the original St. Petersburg, BHV-St. Petersburg, 1997, vol. 1, pp. 15, 66, 249-253.

Rodnikov, D.I., "Formulas and Functions", section "The Concept Function", http://revolution.allbest.ru/programming/00004026_0,html, St. Petersburg, 2003, 15pp.

KArev, Ivan, "Portal Integration with ERP Systems: A SAP JavaConnector (JCo) Case Study", http://lvk.cs.msu.su/old/abstr/int-3.pdf, Moscow, 2003, 2 pp.

Australian Examination Report dated Jan. 13, 2010 cited in 2005202284.

Australian Second Examination Report dated Apr. 23, 2010 cited in 2005202284.

Australian Third Examination Report dated Sep. 3, 2010 cited in 200520284.

European Search Report dated Jun. 28, 2006 cited in Application No. 05104661.3-2201.

European Examination Report dated Feb. 13, 2007 cited in Application No. 05104661.3-1527.

Chinese First Office Action dated Jan. 18, 2008 cited in Application No. 200510089652.8.

Chinese Second Office Action dated Jul. 4, 2008 cited in Application No. 200510089652.8.

Chinese Third Office Action dated Oct. 10, 2008 cited in Application No. 200510089652.8.

Chilean Third Office Action dated late 2007-early 2008 cited in Application No. 1154-2005.

Chilean Secong Office Action dated Aug. 2009 cited in Application No. 1154-2005.

Israeli Examination Report dated Aug. 3, 2009 cited in Application No. 168620.

Mexican Office Action dated Apr. 9, 2010 in Application No. PA/a/2005/005856.

New Zealand Examination Report dated Jun. 7, 2005 cited in Application No. 540421.

New Zealand Second Examination Report dated Mar. 29, 2006 cited in Application No. 540421.

Philippine Examination Report dated Mar. 11, 2010 cited in Application No. 1-2005-00275.

Russian Office Action dated Jan. 18, 2010 in Application No. 2005116632/09(018975).

Russian Decision on Grant dated Jun. 10, 2010 cited in Application No. 2005116632/09(018975).

Singapore/Australian Search Report dated Aug. 28, 2006 cited in Application No. SG200503165-3.

Singapore/Australian Written Opinion date Sep. 12, 2006 cited in Application No. SG200503165-3.

Singapore/Australian Second Written Opinion dated Apr. 20, 2007 cited in Application No. SG200503165-3.

Japanese Notice of Rejection dated Nov. 19, 2010 cited in Application No. 2005-161207.

Microsoft Solutions, "Waht's New in the Digital Dashboard Reseource Kit 2.0, " http://web.archive.org/web/20000816044804/www.microsoft.com/solutions/kd/WhatsNew.htm, 2 pgs., Aug. 18, 2010.

John WAlkenbach, Microsoft Excel 2000 Power Programming with VBA, "Interaction with Other Applications," Excerpt Chapter 19, 19 pgs., Apr. 27, 1999.

Crystal Ball 2000.2 User Manual, 414 pgs., Jun. 2001.

Mark Spencer, "Using Spreadsheets for Analysis and Reporting in Java-Based, Muti-Tier Web Applications," Tidestone Technologies, pp. 1-14, May 10, 2000.

Synthesis Manual, 234 pgs., 1999.

Dave Stearns, "Programming MS Office 2000 Web Components,"Microsoft PRess, 32 pgs., 1999.

Louis Gary Lamit, "Pro/Engineer® 2000i, " 12 pgs., Aug. 10, 1999.

Louis Gary Lamit, "Pro/Engineer® 2000i$^2$," 13 pgs., Mar. 7, 2000.

Fabin Nunez, "An Extended Spreadsheet Paradign for Data Visualisation Systems, and its Implementation," NOv. 2000, pp. 1-144.

Danny Bradbury, "Understanding Digital DAshboard," PC Support Advisory, File: R1155.1, Aug. 2000, pp. 7-12.

Ultimus Version 5.0 Product Guide, Jun. 2001, pp. 1-54.

Torndiag.XLS, 6 pgs., Oct. 1998, http://home.uchicago.edu/~rmyerson . . . .

Chris Kunicki et al., "Microsoft® Office And The Web," Microsoft Tech.Ed 2000, 4-202, 20 pgs., Jun. 6, 2000.

Mike Ammerlaan, "Analysis And Reporting With Office Web Components," Microsft Tech.Ed 2000, 26 pgs., Jun. 6, 2000.

David Shank et al., "Microsoft Office 2000 Visual Basic Programmer's Guide," Microsoft Press, 1999, 98 pgs.

John Walkenbach, "Microsoft Excel 2000 Formulas," 60 pgs., Oct. 15, 1999.

Laurent Longre, "Hidden Name Space in Excel", 1998, 6 pgs. http://www.cpearson.com/excel/hidd . . . .

Bill Jeffries, "Updating Excel from the Web", Oct. 21, 1999, 4 pgs., http;//mediakit.internet.com/icom_c . . . .

"Introduction to Pro/ENGINEER: Contents," Jan. 22, 2010, 449 pgs., http://silverstone.fortunecity.com/daytona/344/proehelp/fundamentals/introtec.htm.

Dr. Raafat N. Inrahim et al., "Development of Parametric Design Systems Using Functional Modeling Algorithm," pp. 329-335, Sep. 1999.

Scott E. Hudson, "User Interface Specification Using an Enhanced Spreadsheet Model," Georgia Institute of Technology, Jul. 1994, pp. 1-25.

Technical Guide, "Formula One™ for Java® ," Robust development tool for developmers and Webmasters, Version 7.0, Tidestone Technologies, Inc. 110 pgs., 1999.

Bill Fane, "Your Table is Waiting . . . ", 1999, General OneFile, 3pgs.

John Walkenbach, Microsoft® Excel 2000 Bible, Gold Edition, 2000, 86 pgs.

Eric Wells et al., "Microsoft® Excel 97 Developer's Handbook," Microsoft Press, 1997, 14 pgs.

Microsoft Solutions, "Digita; Dashboard Overview," Aug. 2010, 2pgs., http;//web.archive.org/web/20000816044747/www.microsoft.com/solutions/km/DDoverview.htm.

Microsoft solutions, "Digital Dashboard," Aug. 2010, 2 pgs., http://web.archive.org/web/20000816044739/www.microsoft.com/solutions/km/digitaldashboard.htm.

R.N. Ibrahim et al., "Design of Parametic Modelling systems," pp. 1-12, 1999.

Frank A. Buytendijk, "The BI schockwave," Intelligent Enterprise, Nov. 16, 1999, pp. 42-48.

Blattner et al., Special Edition Using Microsoft Excel 2000, 1999, 1086 pgs.

Oracle® Discover™ 4$i$, Configuration Guide for Oracle9$i$ Application Server, Release 4.1 for Windows NT, Part No. A87430-01, Dec. 2000, 168 pgs.

Oracle®Discover™ 4$i$ , Configuration Guide for Oracle9$i$ Application Server, Release 4.1 for UNIX, Part No. A87572-01, Dec. 2000, 156 pgs.

Chris Clack et al., "Object-Oriented Functional Spreadsheets," 12 pgs., Sep. 1997.

Discoverer 4$i$ Plus User's Guide Release 4.1, A86731-01, Dec. 21, 2010, http://download.oracle.com/docs/html/A86731_01/toc.htm, 171 pgs.

Tony Davie et al., Functional Hypersheets (Extended Abstract), Functional Programming, Glasgow, 1996, pp. 1-5.

Chris Clack et al., "Object-Oriented Fucntional Spreadsheets," 16pgs., Sep. 1997.

Akihiko Matsumoto, "Feature: Solve difficult challenges—C/S, EPR, DW, Integrated data of Web, Part 2, Methods for total data integration seen in U.S." Network Computing, RIC Telecom, Japan, Oct. 1, 1997, vol. 9, No. 10, pp. 27-31.

Japanese Notice of Rejection dated Feb. 15, 2011 cited in Application No. 2005-158658.

* cited by examiner

METHOD, SYSTEM, AND APPARATUS FOR EXPOSING WORKBOOKS AS DATA SOURCES

CROSS-REFERENCE TO RELATED APPLICATIONS

This application is related to U.S. patent application Ser. No. 10/858,175, entitled "Method, System, and Apparatus for Exposing Workbook Ranges As Data Sources," which was filed on Jun. 1, 2004, and which is expressly incorporated herein by reference.

BACKGROUND OF THE INVENTION

When building workbooks, users of spreadsheet application programs often utilize data from a number of different sources. For instance, when creating a workbook within a spreadsheet application program, a user may import data from another workbook, may enter data into the workbook manually, or may obtain data by executing queries on a relational database or on an on-line analytical processing ("OLAP") cube. Once the data has been entered from any of these sources, a user typically arranges the data in the desired configuration within the workbook. At the end of this process, the user has created a workbook that includes one or more sheets, each of which contain tabular data upon which meaningful numerical analysis may be performed.

In order for other users to access the contents of the workbook, copies of the workbook or portions of it may be made. For instance, in many scenarios the workbook is sent to other users via an electronic mail ("e-mail") message. The users that receive the workbook can then perform analysis on the workbook or add the data contained in the workbook to another workbook. Alternatively, the workbook may be stored on a file share where multiple users can access the contents of the workbook. In order to share the contents of the workbook, ranges of data may also be copied and pasted into other documents.

Although these traditional methods for sharing a workbook allow multiple users to access the contents of a workbook, these methods are not without their drawbacks. First, it is very difficult to administer multiple copies of a workbook that may be duplicated many times across multiple computers and network domains. In particular, it is very difficult for a system administrator to ensure that the workbook is secure and that it is frequently backed up. Moreover, in the case of a file share, it may be very difficult for multiple users to simultaneously access the workbook. For example, if the author of the original workbook needs to update it, then it is extremely difficult to track all the users that use it and have them update their copies. In many cases, the spreadsheet client application locks the workbook when it is opened by one user, thereby preventing others from accessing the file. Additionally, identical functions may be performed on different copies of the workbook, thereby causing duplication of effort and reducing productivity.

It is with respect to these considerations and others that the various embodiments of the present invention have been made.

BRIEF SUMMARY OF THE INVENTION

In accordance with the present invention, the above and other problems are solved by a method, system, and apparatus for exposing workbooks as data sources. By exposing workbooks as server data sources, structured access may be easily had to the contents of the workbook by any application program capable of connecting to and querying a server data source. Moreover, because workbooks are exposed as server data sources when the workbook is published, any user capable of operating a spreadsheet application program can easily create enterprise level data sources.

According to one aspect of the invention, a system is provided for exposing the contents of a workbook as a server data source and for utilizing the server data source. The system includes a client computer capable of executing a spreadsheet application program for creating a workbook. The workbook may include one or more worksheets that include one or more cells containing data.

The spreadsheet application program may also be operative to generate metadata for the data contained therein when the worksheet is authored. The metadata may be predefined to describe the structure of the workbook, such as the rows, columns, and sheets of the workbook. The metadata may be saved with the worksheet. The metadata may be utilized by a server computer when receiving and responding to requests to access the contents of the workbook as a server data source. The spreadsheet application program is further operative to publish a workbook to a server computer. The workbook is then transmitted to the server computer where its contents are exposed as a server data source.

According to aspects of the invention, the system also includes a server computer operative to execute a server program for exposing a workbook as a server data source. As used herein, the terms "data source" and "server data source" refer specifically to a database upon which queries may be executed. This definition includes multi-dimensional databases (such as an OLAP cube) and databases that combine aspects of relational and multi-dimensional databases (such as the Unified Dimensional Model ("UDM")). As also used herein the term "data source query" means a query directed to a data source, such as an OLAP or a multi-dimensional expression ("MDX") query. "Data source query" may also include an SQL query. For instance, SQL may be utilized against a cube using the Microsoft Analysis Services OLEDB provider.

Once the workbook has been exposed, client applications may discover and connect to the workbook as a server data source. When a query is issued against a workbook as a server data source, the server computer is operative to recalculate the workbook. If the workbook contains a reference to another data source, any data necessary to recalculate the workbook may be retrieved from the data source prior to the recalculation. Once the workbook has been recalculated, the server computer is operative to generate a representation (such as a multi-dimensional data source like a cube) of the workbook. This may include, for instance, generating a temporary OLAP cube corresponding to the workbook. The three dimensions of the cube may be defined by the rows, columns, and sheets of the workbook. Additionally, a set of workbooks can be taken together to add a fourth dimension to the cube.

Once the representation has been generated, the server computer is operative to perform the requested query on the representation. The result of the query is then returned to the requesting client application program. In this manner, for instance, a user can easily author a workbook and publish the workbook to a server computer where its contents may be exposed as a cube. Other users utilizing database client applications, such as an OLAP client, can then discover the workbook and issue native queries against its contents.

The invention may be implemented as a computer process, a computing apparatus, or as an article of manufacture such as a computer program product or computer readable media.

The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
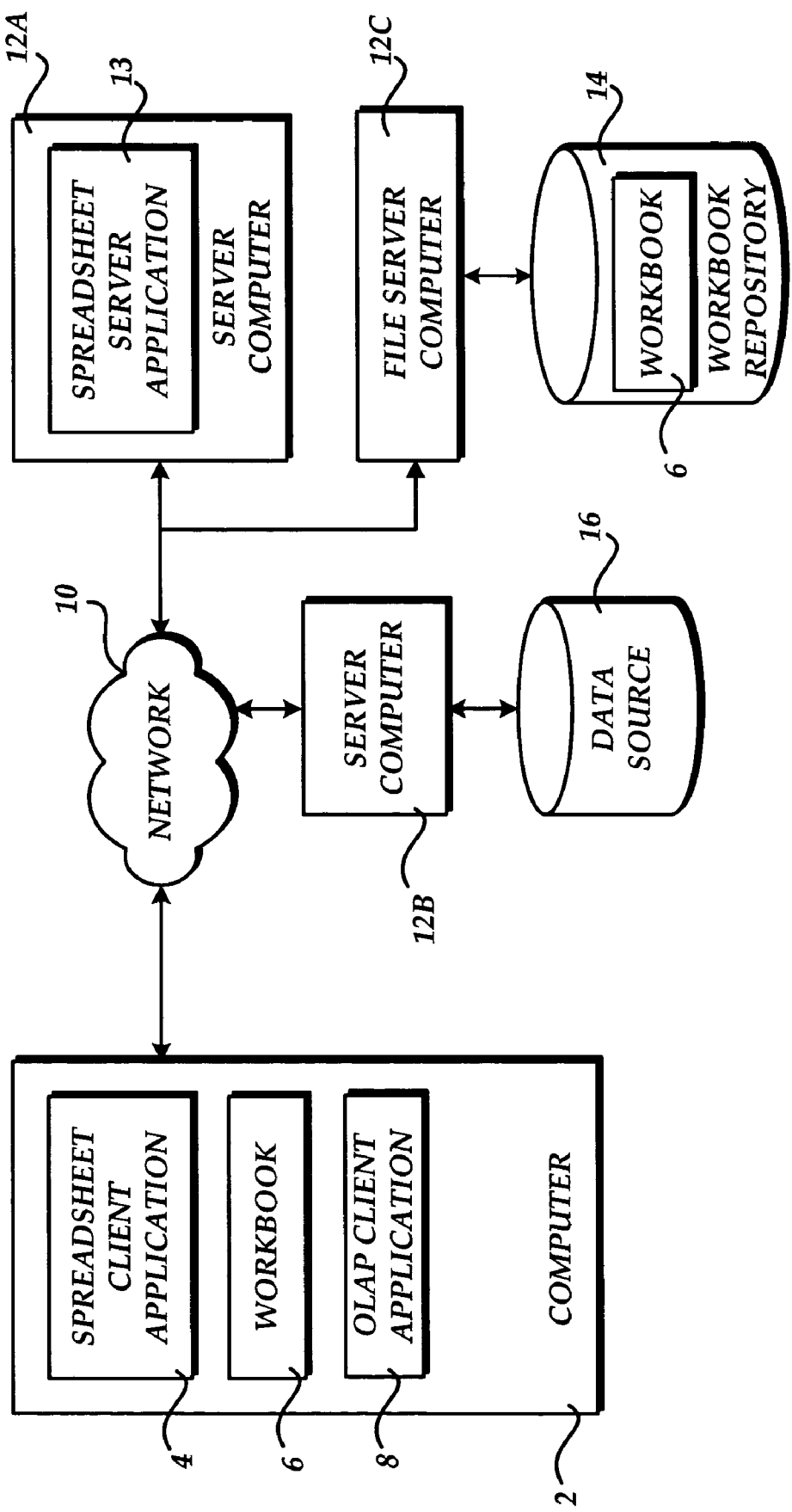
FIG. 1 is a computer network diagram illustrating aspects of several computer systems utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the several embodiments of the invention will be described. As shown in FIG. 1, a network 10 interconnects a client computer 2 and several server computers 12A-12C. It should be appreciated that the network 10 may comprise any type of computing network, including a local area network or a wide area network, such as the Internet. The network 10 provides a medium for enabling communication between the client computer 2, the server computers 12A-12C, and potentially other computer systems connected to or accessible through the network 10.

The client computer 2 comprises a general purpose desktop or laptop computer capable of executing one or more application programs. In particular, according to the various embodiments of the invention, the computer 2 is operative to execute a spreadsheet client application 4. As known to those skilled in the art, the spreadsheet client application program 4 provides functionality for creating budgets, performing financial forecasting, and other finance and numeric-related tasks. In order to provide this functionality, data values may be organized using cells and the relationships between the cells may be defined using formulas. A change to one cell produces changes to related cells. Spreadsheet programs usually provide graphing capabilities for output and a variety of formatting options for text, numeric values, and graph features.

According to embodiments of the invention, the spreadsheet client application 4 may be utilized to create a workbook 6. The workbook 6 is a file that is created by a spreadsheet program that contains one or more worksheets (a worksheet may also be referred to herein as a "spreadsheet"). A worksheet is a single page organized into rows and columns within the spreadsheet program and appearing on screen and used for constructing a single table.

Worksheets within the workbook 6 may include one or more ranges that include data objects. As defined herein, a data object includes any object within a worksheet that is utilized to store data. For instance, data objects may include, but are not limited to, an arbitrary range of cells, pivot tables, DOEs, lists, databases, and query tables. As will be described more fully herein, the entire contents of a workbook, including each of these types of data objects, may be exposed as a server data source available from the server 12A.

It should be appreciated that, according to one embodiment of the invention, the spreadsheet client application 4 comprises the EXCEL spreadsheet application program from MICROSOFT CORPORATION of Redmond, Wash. It should be appreciated, however, that the various aspects of the invention described herein may be utilized with other spreadsheet application programs from other manufacturers. Moreover, although the inventive aspects described herein are presented in the context of a spreadsheet application program, it should be appreciated that other types of application programs may also be utilized to embody the various aspects of the invention.

According to other embodiments of the invention, the client computer 2 may also be operative to execute an OLAP client application 8. The OLAP client application 8 comprises an application program capable of connecting to, querying, and utilizing data from an OLAP data source. For instance, the OLAP client application 8 may connect to the server computer 12B through the network 10. Through database software executing on the server computer 12B, the OLAP client application 8 may issue queries against the data source 16. The server computer 12B is then operative to receive and respond to the queries from the OLAP client application 8.

As will be described in greater detail below, the OLAP client application 8 may also issue queries against a workbook 6. In order to enable this functionality, the spreadsheet client application 4 may publish the workbook 6 to a repository 14 maintained by a file server computer 12C and accessible to the server computer 12A. The spreadsheet server application 13 executing on the server computer 12A may then parse the workbook 6 and expose the contents of the workbook 6 as a server data source. The OLAP client application 8 may then connect to the data source exposed by the spreadsheet server application 12A in the same manner that it would connect to a dedicated OLAP data source, such as that provided by the server computer 12B. It should be appreciated that the spreadsheet client application 4 may act as a consumer of data from a data source in the same manner as the OLAP client application 8. It should also be appreciated that the computer 2 may be operative to execute additional client applications for querying and consuming data from other types of databases. It should further be appreciated that in an alternative embodiment, the functions of the computer 2 described above may be divided among two computing devices. For instance, one computing device may be operative to execute the spreadsheet application 4 for publishing the workbook 6 while the other computing device may be operative to execute client applications for consuming data.

As used herein, the terms "data source" and "server data source" refer specifically to a database upon which queries may be executed. This definition includes multidimensional databases (such as an OLAP cube) and databases that combine aspects of relational and multidimensional databases (such as the UDM). As also used herein the term "data source query" means a query directed to a data source, such as an OLAP or MDX query.

The spreadsheet server application 13 comprises a server-based application program that may execute without the use of a display screen (headless). The spreadsheet server application 13 is operative to perform many of the functions of the spreadsheet client application 4 on a server computer. For instance, the spreadsheet server application 13 can load and calculate a workbook 6. As will be described herein, the spreadsheet server application 13 also provides functionality for exposing a workbook 6 as a data source to compatible clients via the network 10. Additional details regarding the various functions performed by the spreadsheet client application 4 and the spreadsheet server application 13 will be provided below with respect to FIGS. 2-6.

Figure 2:
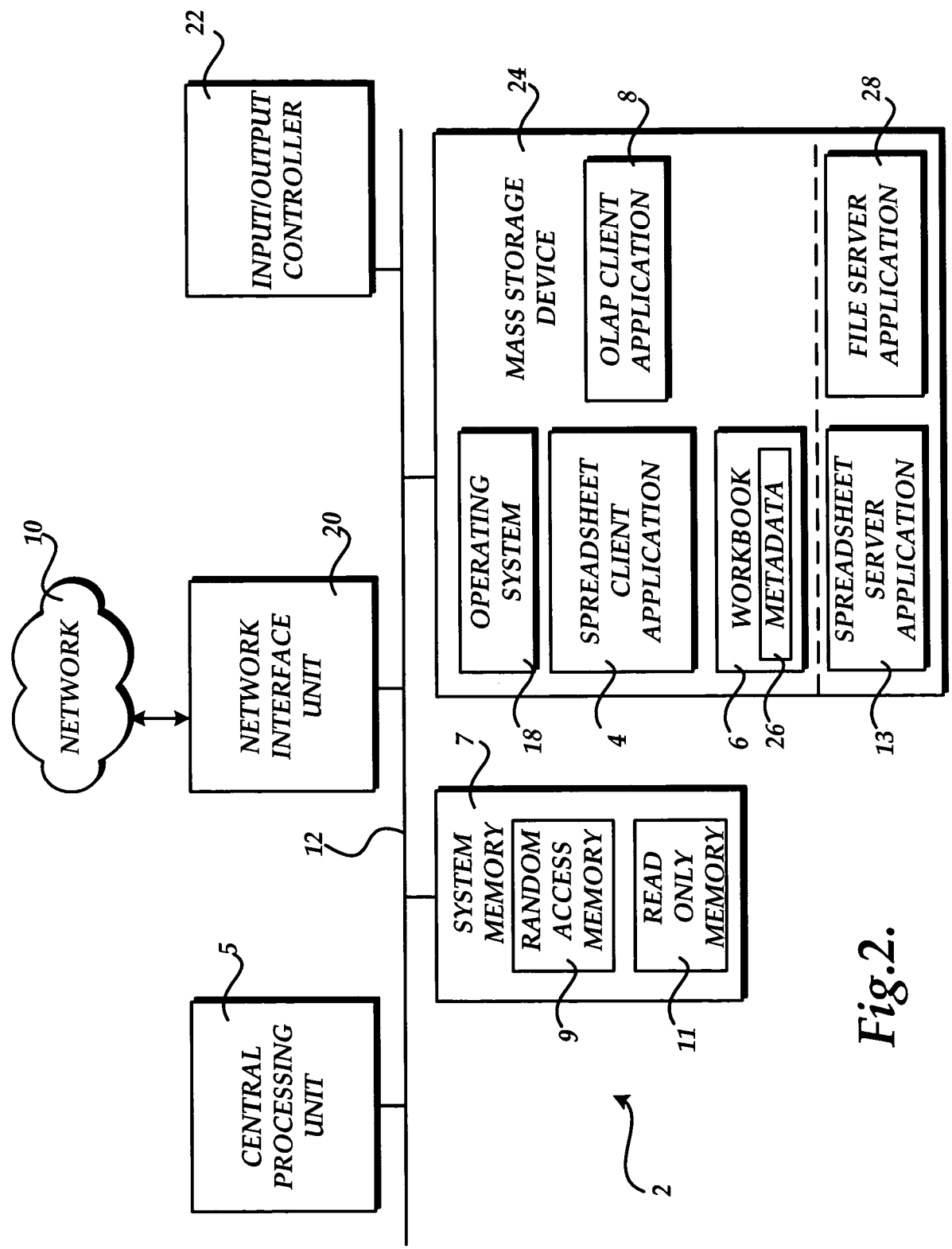
FIG. 2 is a computer system architecture diagram illustrating aspects of a client computer system utilized in and provided by the various embodiments of the invention.

Referring now to FIG. 2, an illustrative computer architecture for a computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 24 for storing an operating system 18, application programs, and other program modules, which will be described in greater detail below.

The mass storage device 24 is connected to the CPU 5 through a mass storage controller (not shown) connected to the bus 12. The mass storage device 24 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 10, such as the Internet. The computer 2 may connect to the network 10 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 24 and RAM 9 of the computer 2, including an operating system 18 suitable for controlling the operation of a networked personal computer, such as the WINDOWS XP operating system from MICROSOFT CORPORATION of Redmond, Wash. The mass storage device 24 and RAM 9 may also store one or more program modules. In particular, the mass storage device 24 and the RAM 9 may store a spreadsheet client application 4 and an OLAP client application 8, as described above. The mass storage device 24 and RAM 9 may also store a workbook 6 created by the spreadsheet client application 4.

According to one embodiment of the invention, the spreadsheet application program 4 is also operative to generate metadata 26 for the workbook 6. The metadata 26 may be predefined to describe the structure of the workbook, such as the rows, columns, and sheets of the workbook. The metadata 26 may be stored within the workbook 6 and saved with the workbook. The metadata 26 may be utilized by the server computer 12A when receiving and responding to requests to access the workbook 6 as a server data source.

It should be appreciated that, in embodiments of the invention, the spreadsheet client application program 4 is operative to provide a facility for allowing a user to edit the metadata 26 created by the spreadsheet application program 4 for the data objects contained in a workbook 6. For instance, a user may be permitted to define a subset of the cube through the facility. In this manner, a user may be able to specify, for instance, that only rows 1-10 and columns 5-15 are transformed in the cube and to give these elements a different name.

It should be appreciated that the server computers 12A-12C may include many of the conventional computing components illustrated in FIG. 2 and described above. Additionally, the server computer 12A may be operative to store and execute a spreadsheet server application 13. The file server computer 12C may be operative to store and execute a file server application 28 for receiving and responding to requests for files stored in the repository 14, such as a workbook 6. It should be appreciated that the server computers 12A-12C may include other conventional components not illustrated in FIG. 2 but known to those skilled in the art.

Figure 3:
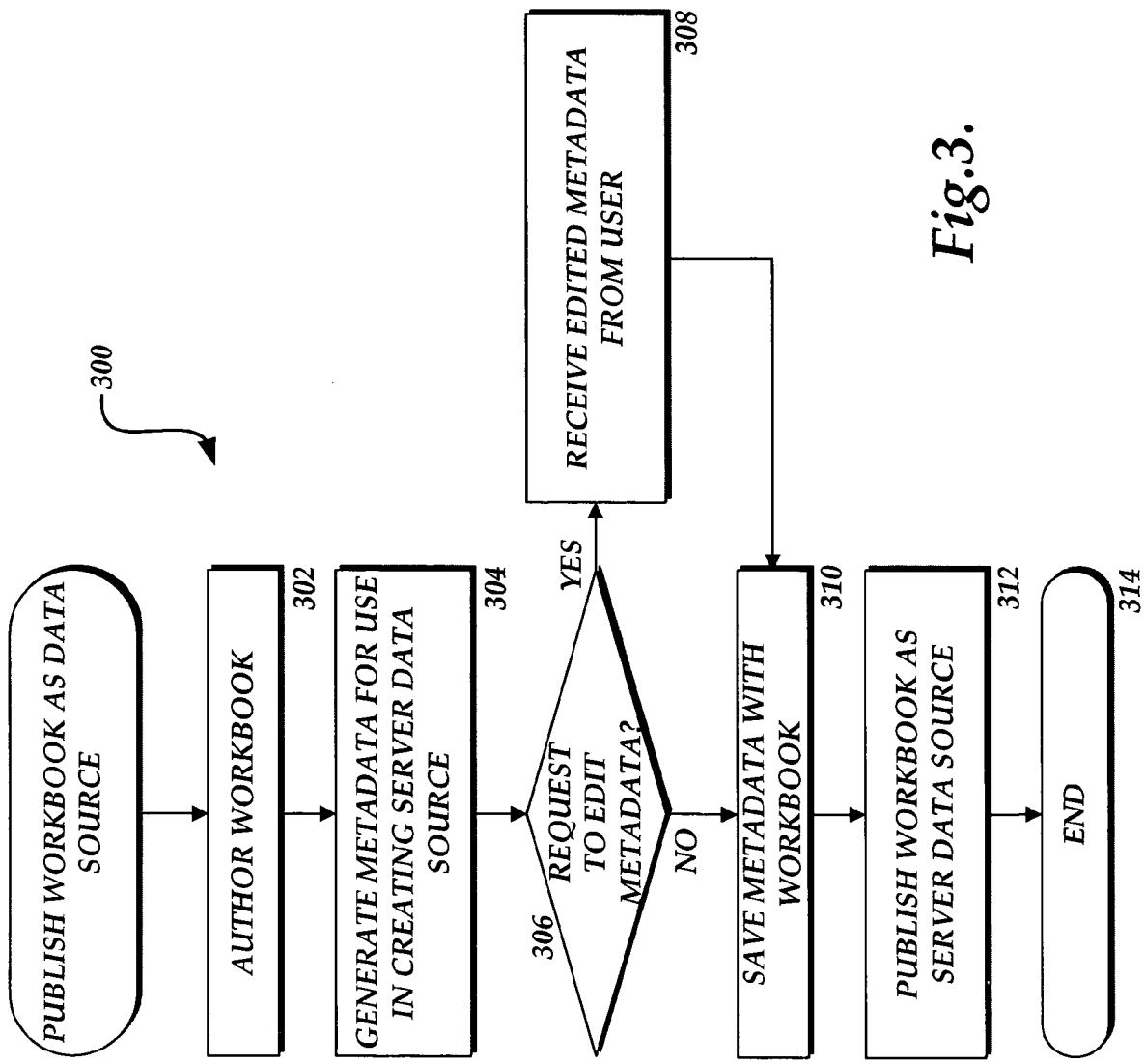
FIG. 3 is a flow diagram illustrating aspects of a process for publishing a workbook range as a server data source according to one embodiment of the invention.

Referring now to FIG. 3, an illustrative routine 300 will be described illustrating a process performed by the spreadsheet client application program 4 for publishing a workbook as a server data source. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3 and 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where a user utilizes the spreadsheet client application 4 to author the workbook 6. In particular, as described herein, the user may utilize the various facilities provided by the spreadsheet client application 4 to create a workbook including one or more worksheets, each having one or more columns and rows. Each of the worksheets may also include any of the conventional objects that may be utilized within a worksheet, such as formulas, data objects, pivot tables, and other types of objects. The user also may manually enter data or create a query in the workbook 6 of a data source 16. The various functions and methodologies that may be utilized within a spreadsheet client application 4 to create a workbook 6 are virtually unlimited and well-known to those skilled in the art.

From operation 302, the routine 300 continues to operation 304, where the spreadsheet client application 4 generates the metadata 26 for use by the server application 13 in responding to requests to access the workbook 6 as a multi-dimensional data source. In particular, the spreadsheet client application 4 may analyze the data contained within the workbook 6 to identify data that may be utilized to describe the data within the workbook 6. For instance, with respect to a multidimensional data source, the spreadsheet client application 4 may identify measures, hierarchy, and default aggregations for the various data within the workbook 6.

Values for these properties may also be set by the spreadsheet client application 4 in an intelligent manner. For instance, with respect to a string data field, the spreadsheet client application 4 may indicate the default aggregation as being a count. With regard to numeric data fields, the spreadsheet client application 4 may set the default aggregation to being a sum. Other types of intelligent decisions may be made by the spreadsheet client application 4 to identify metadata within the workbook 6 and to set properties for the metadata.

From operation 304, the routine 300 continues to operation 306, where the spreadsheet client application 4 determines whether a user has made a request to edit the metadata generated by the spreadsheet client application 4. As described briefly above, the spreadsheet client application 4 may provide a user interface for editing the generated metadata. This may be useful, for instance, to allow a user to override the intelligent decisions made by the spreadsheet client application 4 when identifying metadata within the workbook 6 and setting various properties on the metadata.

If, at operation 306, the spreadsheet client application 4 determines that a request to edit the metadata has been received, the routine 300 branches to operation 308. At operation 308, the spreadsheet client application 4 receives edited metadata from the user. From operation 308, the routine 300 continues to operation 310.

If, at operation 306, the spreadsheet client application 4 determines that a request to edit the metadata has not been received, the routine 300 continues to operation 310. At operation 310, the metadata 26 generated by the spreadsheet client application 4, and potentially edited by the user, is saved with the workbook 6. Saving of the workbook 6 may occur automatically or may occur in response to a user request.

From operation 310, the routine 300 continues to operation 312, where the workbook 6, including the metadata 26, is published to the spreadsheet server application 13. Publication of the workbook 6 may occur in response to a user command or may occur automatically. For instance, publication of the workbook 6 may include uploading the workbook 6 to the server computer 12A or programmatically generating the workbook 6 and sending it to the server computer 12A through a server application program interface ("API").

When the workbook 6 is published to the spreadsheet server application 13, the workbook 6 is stored in the repository 14. The spreadsheet server application 13 is also notified of the existence of the workbook 6 and the workbook 6 may then be exposed as a multi-dimensional data source.

Once the workbook 6 has been propagated to the repository 14 and analyzed by the spreadsheet server application 13, database client applications, such as the OLAP client application 8 or the spreadsheet client application 4, may be utilized to query the contents of the workbook 6 as a data source. Additional details regarding the various functions performed by the spreadsheet server application 13 in order to expose the contents of the workbook 6 as a data source and to receive and respond to data source query requests will be described in greater detail below with respect to FIG. 5. From operation 312, the routine 300 continues to operation 314, where it ends.

It should be appreciated that queries directed toward a workbook exposed as a server data source may be utilized to mimic functionality provided by the spreadsheet client application 4. For instance, an Automatic Filter ("auto filter") tool may be provided for filter subsets of data within a workbook. The functionality provided by the auto filter will then be reflected in the published data source. Alternatively, a complex MDX statement may be utilized to select the rows and columns from the cube, thereby providing the same functionality.

Figure 4:
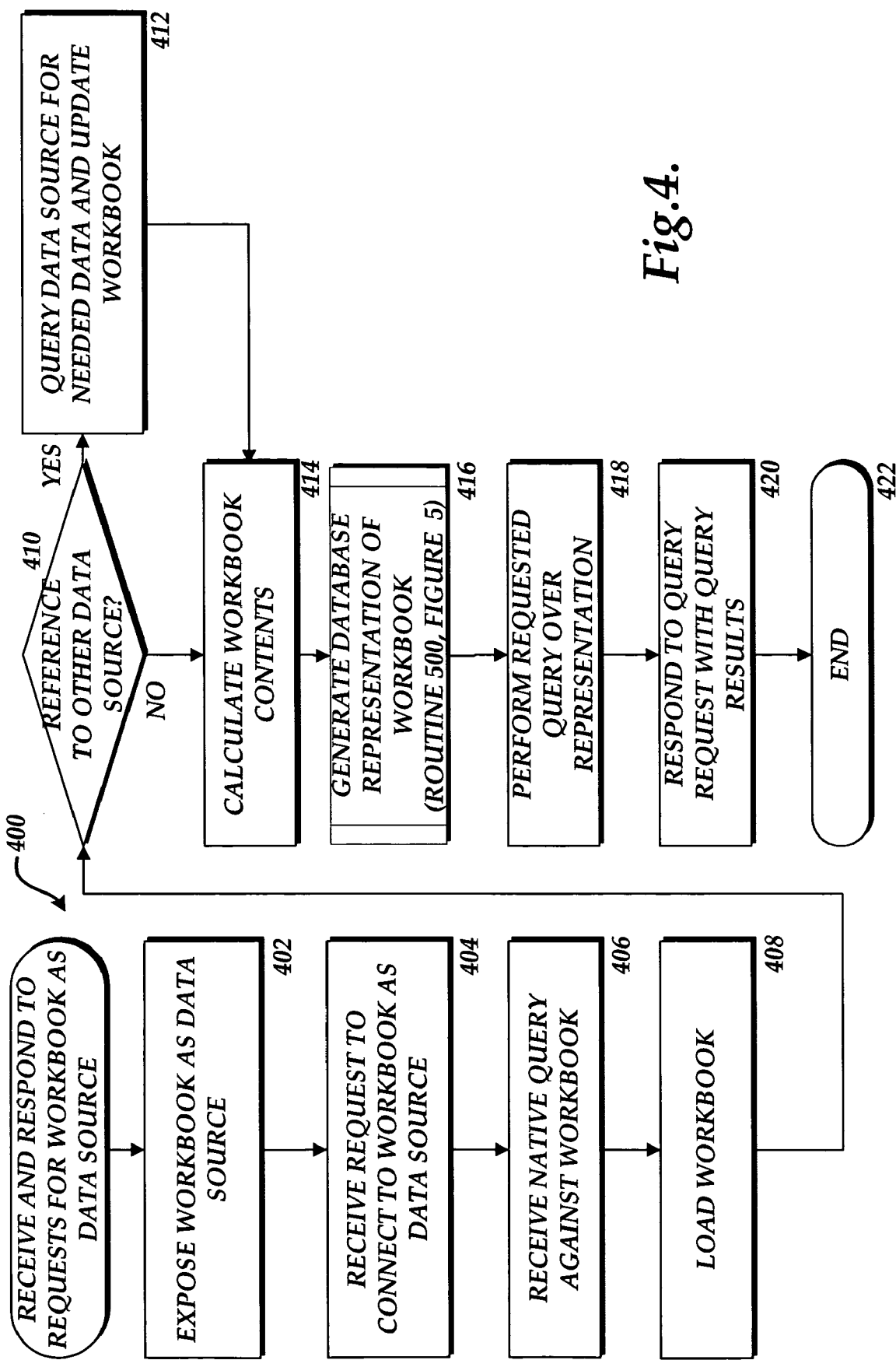
FIG. 4 is a flow diagram illustrating aspects of a process for receiving and responding to requests for the contents of a workbook as a server data source according to one embodiment of the invention.

Turning now to FIG. 4, an illustrative routine 400 will be described illustrating the operation of the spreadsheet server application 13 for receiving and responding to requests for the contents of a workbook as a data source. The routine 400 begins at operation 402, where the spreadsheet server application 13 exposes the workbook as a server data source. According to one embodiment of the invention, the workbook is exposed through a data connection manager such as the one described in the co-pending U.S. patent application Ser. No. 10/858,190, entitled "Method, System, and Apparatus for Discovering and Connecting to Data Sources" which is expressly incorporated herein by reference. Alternatively, the workbook 6 stored within the repository 14 may be exposed utilizing other types of analysis server interfaces, such as UDM. Once the spreadsheet server application 13 has exposed the workbook 6, a client application such as the OLAP client application 8 or the spreadsheet client application 4 may discover the workbook data source and issue requests querying the data source.

The routine 400 continues from operation 402 to operation 404, where the spreadsheet server application 13 receives a request to connect to a workbook as a server data source. For instance, at operation 406, the spreadsheet server application 13 may receive a native query against a range of a workbook. For instance, the OLAP client application may issue a native OLAP query to the spreadsheet server application 13. Alternatively, other types of queries may be issued to the spreadsheet server application 13 such as MDX and XML-A queries. Other types of standards for querying a database known to those skilled in the art may also be utilized.

At operation 408, the spreadsheet server application 13 loads the workbook 6 to which a query has been directed. Once the workbook 6 has been loaded by the spreadsheet server application 13, the routine 400 continues to operation 410, where the spreadsheet server application 13 determines whether the workbook 6 includes a reference to another data source. For instance, as described briefly above, the workbook may include a reference to a data source, such as the data source 16.

If the workbook 6 includes a reference to another data source, the routine 400 branches to operation 412, where the spreadsheet server application 13 queries the data source 16 for any data needed to calculate the workbook 6. Once this data is received by the spreadsheet server application 13, the workbook 6 is updated with the received data.

If, at operation 410, it is determined that the workbook 6 does not include a reference to another data source, the routine 400 continues to operation 414. At operation 414, the spreadsheet server application 13 recalculates the contents of the workbook 6. This may include, for instance, calculating the values of any formulas contained within the workbook 6.

From operation 414, the routine 400 continues to operation 416, where the spreadsheet server application 13 generates a database representation of the calculated workbook. In particular, a temporary database representation, such as a multi-dimensional cube, is generated by the spreadsheet server application 13. The database representation is generated temporarily in order to perform the requested query over the workbook 6. Additional details regarding the process performed by the spreadsheet server application 13 to generate the cube are provided below with respect to FIG. 5.

Once the database representation of the requested workbook has been generated, the routine 400 continues to operation 418, where the spreadsheet server application 13 performs the requested query on the database representation of the calculated workbook. In response to performing the query, a query result is generated that satisfies the initial query received from the client application. From operation 418, the routine 400 continues to operation 420, where the spreadsheet server application 13 responds to the original query request with the identified query result. From operation 420, the routine 400 continues to operation 422, where it ends.

Figure 5:
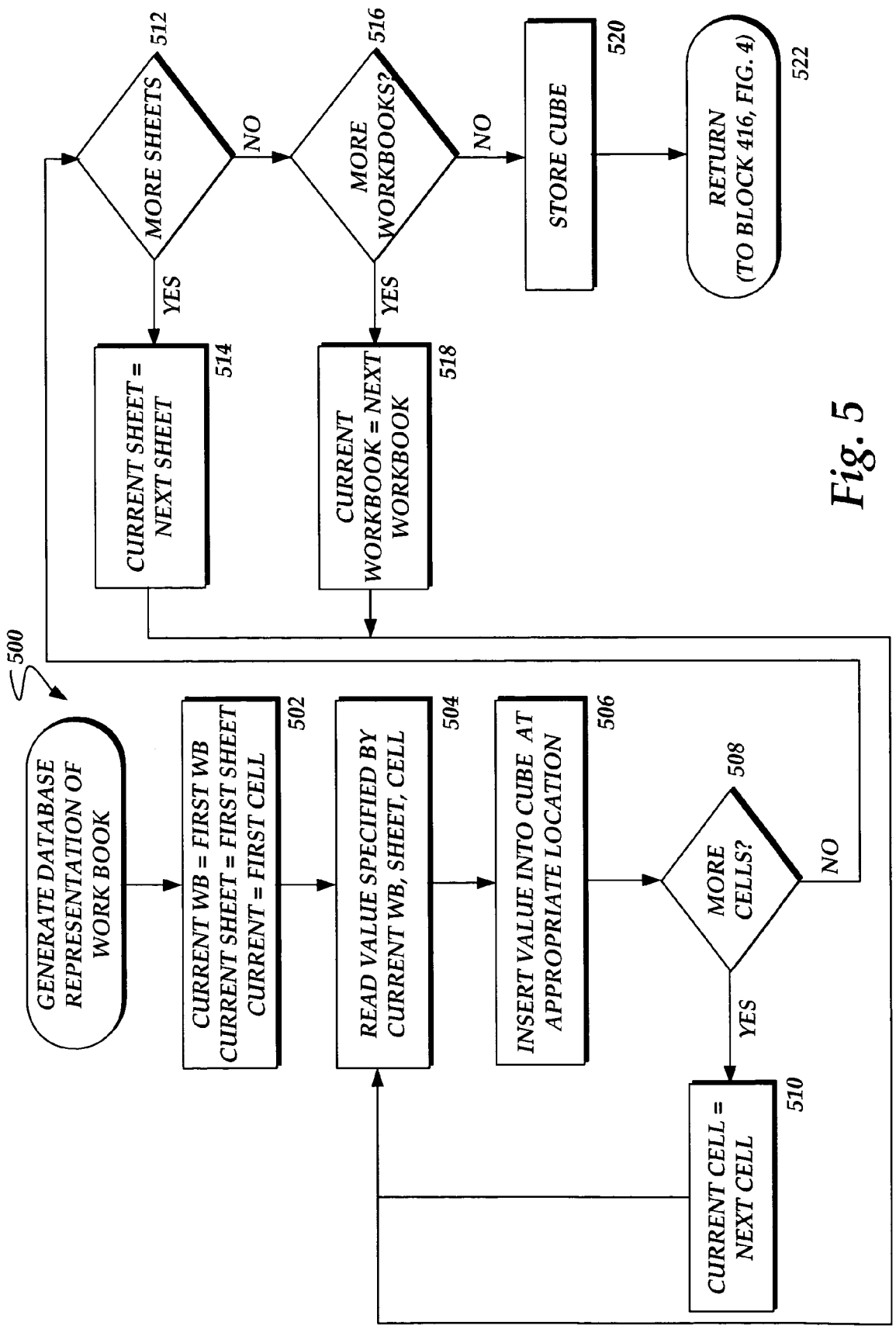
FIG. 5 is a flow diagram illustrating a process for generating a database representation of a workbook according to one embodiment of the invention.

Turning now to FIG. 5, an illustrative routine 500 will be described for generating a multi-dimensional cube corresponding to the contents of a workbook. The routine 500 begins at operation 502, where temporary variables corresponding to the current workbook, the current worksheet, and the current cell are set to the first workbook, the first worksheet, and the first cell, respectively. As will be described in detail below, these variables are used to keep track of the current position within the universe of workbooks, sheets, and cells. As will also be seen from the detailed description provided below, each cell in each worksheet and each workbook containing data is analyzed, and the contents of each cell is transferred to a corresponding location in the new multi-dimensional data structure. The temporary variables referenced with respect to block 502 are utilized to keep track of the current position within universe of workbooks.

From operation 502, the routine 500 continues to operation 504, where the data contained within the cell specified by the value of the temporary variable for the current workbook, current sheet, and current cell is read. Once the value has been read, the routine 500 continues to operation 506, which the data value is inserted into the multi-dimensional data structure at the appropriate location. As will be described in greater detail below with reference to FIG. 6, the multi-dimensional data structure may be arranged with one dimension corresponding to rows within a worksheet, one dimension corresponding to columns within a worksheet, and a third dimension corresponding to additional worksheets, if present. Accordingly, the value specified by the current workbook, sheet, and cell, is moved into the appropriate position within the appropriate dimension of the new multi-dimensional data structure.

From operation 506, the routine 500 continues to operation 508, where a determination is made as to whether additional cells remain to be analyzed within the current worksheet. If additional cells are remaining, the routine 500 branches to operation 510, where the variable corresponding to the current cell is set equivalent to the next cell to be processed. From operation 510, the routine then returns to operation 504 where the contents of the next cell are read.

If, at operation 508, it is determined that no additional cells remain to be analyzed in the current worksheet, the routine 500 continues to operation 512. At operation 512, a determination is made as to whether additional worksheets remain to be analyzed within the current workbook. If additional worksheets remain to be analyzed, the routine 500 branches to operation 514, where the variable corresponding to the current worksheet is set equivalent to the next worksheet. The routine 500 then continues from operation 514 to operation 504 where the next worksheet is analyzed.

If, at operation 512, it is determined that no additional worksheets remain to be processed within the current workbook, the routine 500 continues to operation 516. At operation 516, a determination is made as to whether additional workbooks remain to be processed. It should be appreciated that multiple workbooks may be exposed by the spreadsheet application program simultaneously. It should be further appreciated that the additional workbooks comprise a fourth dimension for the multi-dimensional data structure. If additional workbooks remain to be processed, the routine 500 branches to operation 518, where the variable corresponding to the current workbook is set to the next workbook. The routine then continues from operation 518 to operation 504 where the next workbook is processed.

If, at operation 516, it is determined that no additional-workbooks remain to be processed, the routine 500 continues from operation 516 to operation 520. At operation 520, the multi-dimensional cube is stored for use by the server computer. The routine 500 then continues to operation 522, where it returns to operation 416, discussed above with reference to FIG. 4.

Figure 6:
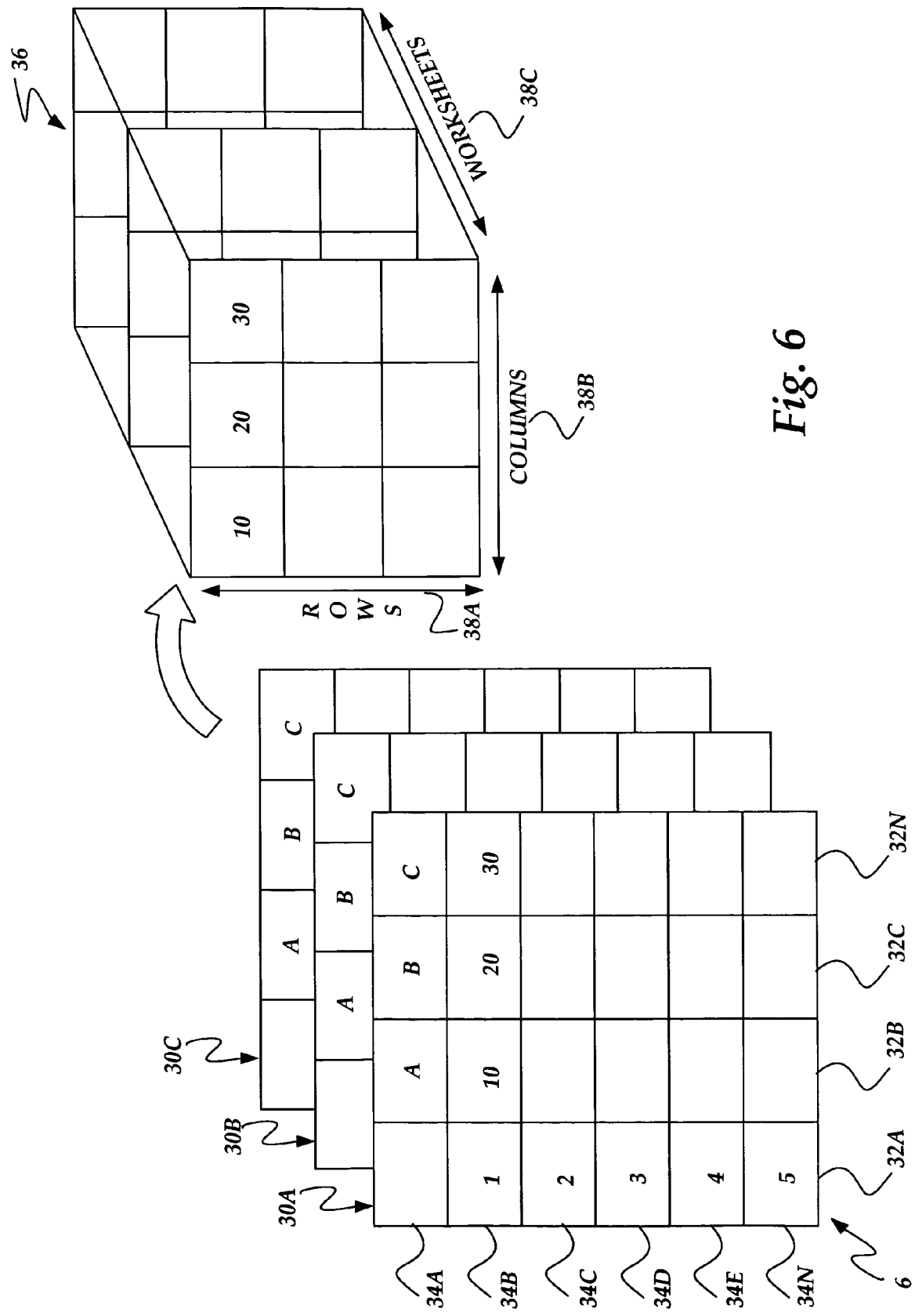
FIG. 6 is a flow diagram illustrating the conversion process for converting a workbook to a multi-dimensional data source according to one embodiment.

Turning now to FIG. 6, additional details will be provided regarding the process of converting the contents of a workbook into a multi-dimensional data structure, such as a cube. As shown in FIG. 6, a workbook 6 may include one or more worksheets 30A-30C. Each of the worksheets is organized in a conventional manner and may include any number of rows, 34A-34N in any number of columns 32A-32N. The intersection of any row and any column comprises a cell into which data may be entered. For instance, as shown in FIG. 6, the intersection of column 32B and row 34B (cell "A1") comprises a cell into which the number 10 has been entered.

As discussed briefly above with respect to FIG. 5, a multi-dimensional data source 36 may be organized as three-dimensional cube. A first dimension 38A of the cube may correspond to the rows 34A-34N within the various worksheets. A second dimension 38B of the multi-dimensional data source 36 may correspond to the columns 32A-32N within the various worksheets. A third dimension 38C of the multi-dimensional data source 36 may correspond to the various worksheets 30A-30C contained within a particular workbook. As also discussed above with respect to FIG. 5, a fourth dimension may be allocated corresponding to additional workbooks.

As discussed above briefly with respect to FIG. 5, in order to convert the workbook 6 into the multi-dimensional data source 36, each of the cells contained within each of the worksheets 30A-30C is analyzed and any data contained therein is transferred to the corresponding location within the multi-dimensional data source 36. For instance, the data contained within the cells of row 34B in the worksheet 30A have been moved into an appropriate location within the three-dimensional data source 36 as shown in FIG. 6. It should be appreciated that the contents of other cells and other types of objects contained within in the workbook 6 may be transferred to the corresponding location within the multi-dimensional data source 36 in a similar manner.

Based on the foregoing, it should be appreciated that the various embodiments of the invention include a method, system, apparatus, and computer-readable medium for exposing and utilizing a workbook as server data source. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for exposing the contents of a workbook as a data source, the method comprising:
   receiving, by a computer, a database query directed toward the workbook, wherein the workbook comprises a first data source;
   in response to the received query:
      determining whether the workbook contains a reference to at least one second data source,
      in response to determining that the workbook contains a references to the at least one second data source, retrieving from the at least one second data source the data necessary to calculate the workbook,
      calculating the workbook,
      generating a database representation of the calculated workbook, wherein generating the database representation comprises:
         setting variables corresponding to the workbook, a worksheet, and a cell, wherein the set variables comprises a first workbook, a first worksheet, and a first cell,
         reading the variables for the first workbook, the first worksheet, and the first cell,
         inserting the variables into the database representation,
         determining whether additional cells have to be analyzed,
         in response to determining that additional cells have to be analyzed, setting the variable corresponding to the first cell to a second cell,
         reading the variable of the second cell,
         in response to determining that no additional cells have to be analyzed, determining whether additional worksheets have to be analyzed,
         in response to determining that no additional worksheets have to be analyzed, setting the variable corresponding to the first worksheet to a second worksheet,
         reading the variable of the second worksheet,
         in response to determining that no additional worksheets have to be analyzed, determining whether additional workbooks have to be analyzed,
         in response to determining that additional workbooks have to be analyzed, setting the variable corresponding to the first workbook to a second workbook,
         reading the variable of the second workbook,
         analyzing a first data contained within the workbook, wherein analyzing the first data comprises identifying a second data corresponding to the first data, the second data describing at least one of the following: measures, a predefined hierarchy, indicating a structure of the first data, and default aggregations indicating a content for the data fields within the workbook,
         using the second data, at least one workbook variable, at least one worksheet variable, the at least one second data source, and at least one cell variable to map a third data from the calculated workbook to the database representation of the calculated workbook, wherein the database representation comprises a multi-dimensional cube wherein the first dimension is associated with at least one worksheet row, a second dimension is associated with at least one worksheet column, a third dimension is associated with at least one second worksheet, and a fourth dimension is associated with the at least one second data source,
      performing the received query of the database representation of the calculated workbook to obtain a query result, and transmitting the query result as a response to the database query;
   receiving a request to edit the second data by a user; and
   in response to the received request:
      providing a facility for editing the second data, wherein the editing the second data comprises defining a subset of the first data, and
      receiving the second data edited by the user.

2. The method of claim 1, wherein the database representation comprises a cube and wherein the database query is received from an OLAP client application.

3. The method of claim 1, wherein prior to receiving the database query directed toward the workbook, publishing the workbook.

4. The method of claim 3, wherein publishing the workbook comprises utilizing a spreadsheet application to create the workbook.

5. The method of claim 3, wherein publishing the workbook comprises generating metadata, wherein generating metadata comprises utilizing data to describe data within the workbook.

6. The method of claim 5, wherein in response to generating metadata, determining whether a request to edit the metadata was received.

7. The method of claim 6, wherein in response to determining that the request to edit the metadata was received:
   providing a user interface;
   overriding the metadata;
   setting new metadata; and
   saving the new metadata with the workbook.

8. The method of claim 6, wherein in response to determining that the request to edit the metadata was not received, saving the metadata with the workbook.

9. A method for exposing the contents of a workbook as a first server data source, the method comprising:
   providing a facility for authoring the workbook comprising at least one worksheet having at least one cell;
   publishing the workbook to a server computer, wherein publishing the workbook to a server computer exposes the at least one worksheet and the at least one cell at the server computer as a multi-dimensional data source, wherein the multi-dimensional data source comprises a cube, the cube comprising at least one of the following: a first dimension associated with at least one row in a first worksheet, a second dimension associated with at least one column, in the first worksheet, a third dimension associated with a second worksheet, and fourth dimension associated with at least one second server data source;
   receiving a query directed to the multi-dimensional data source;
   in response to the query:
      retrieving from the at least one second server data source the data necessary to calculate the workbook,
      calculating the workbook at the server computer, and
      generating the multi-dimensional data source from the calculated workbook, wherein generating the multi-dimensional data source comprises:
         setting variables corresponding to the workbook, a worksheet, and a cell, wherein the variables set comprises a first workbook, a first worksheet and a first cell,
         reading the variables for the first workbook, the first worksheet and the first cell,
         inserting the variables into the multi-dimensional data source,
         determining whether additional cells have to be analyzed,
         in response to determining that additional cells have to be analyzed, setting the variable corresponding to the first cell to a second cell,
         reading the variable of the second cell,
         in response to determining that no additional cells have to analyzed, determining whether additional worksheets have to be analyzed,
         in response to determining that additional worksheets have to be analyzed, setting the variable corresponding to the first worksheet to a second worksheet,
         reading the variable of the second worksheet,
         in response to determining that no additional worksheets have to be analyzed, determining whether additional workbooks have to be analyzed,
         in response to determining that additional workbooks have to be analyzed, setting the variable corresponding to the first workbook to a second workbook,
         reading the variable of the second workbook,
         analyzing a first data contained within the workbook, wherein analyzing the first data comprises identifying a second data corresponding to the first data, the second data describing at least one of the following: measures, a predefined hierarchy indicating a structure of the first data, and default aggregations indicating a content for data fields, and
         using at least one workbook variable, at least one worksheet variable, the at least one second server data source, and at least one cell variable to map a third data from the calculated workbook to the multi-dimensional data source;
      performing the received query on the generated multi-dimensional data source to produce a query result;
      responding to the received query with the query result; and
      receiving a request to edit the second data by a user;
   in response to the received request:
      providing a facility for editing the second data, wherein editing the second data comprises defining a subset of the multi-dimensional data source, and
      receiving the second data edited by the user.

10. The method of claim 9, wherein publishing the workbook comprises utilizing a spreadsheet application to create the workbook.

11. The method of claim 9, wherein publishing the workbook comprises generating metadata, wherein generating metadata comprises utilizing data to describe data within the workbook.

12. The method of claim 11, wherein in response to generating metadata, determining whether a request to edit the metadata was received.

13. The method of claim 12, wherein in response to determining that the request to edit the metadata was received:
    providing a user interface;
    overriding the metadata;
    setting new metadata; and
    saving the new metadata with the workbook.

14. The method of claim 12, wherein in response to determining that the request to edit the metadata was not received, saving the metadata with the workbook.

15. A method for exposing and utilizing a workbook as a first server data source, the method comprising:
    authoring the workbook comprising at least one worksheet having at least one cell and at least one reference to at least one second server data source;
    generating metadata for at least one data object, the metadata being available to a server computer in responding to requests for querying the workbook as the first server data source, wherein generating metadata for the at least one data object comprises:
    analyzing a first data contained within the workbook, wherein analyzing the first data comprises identifying a second data corresponding to the first data, the second data describing at least one of the following: measures, a predefined hierarchy indicating a structure of the first data, and default aggregations indicating a content for data fields and setting a metadata property;
    publishing the workbook and the metadata to the server computer;
    receiving a request to edit the metadata by a user;
    in response to the received request:
    providing a facility for editing the metadata, wherein editing the metadata comprises defining a subset of the first data, and
    receiving the metadata edited by the user;
    exposing the workbook as the first server data source;
    receiving a server data source query at the server computer referencing data contained within the workbook;

in response to receiving the query:
loading the workbook,
retrieving from the at least one second server data source the data necessary to calculate the workbook, and
calculating the workbook;
generating a database representation of the workbook utilizing the metadata to map the first data contained within the workbook to the database representation of the calculated workbook, wherein the database representation comprises a multi-dimensional cube wherein a first dimension is associated with at least one worksheet row, a second dimension is associated with at least one worksheet column, a third dimension is associated with at least one second worksheet, and a fourth dimension is associated with the at least one second server data source, wherein generating the database representation comprises:
setting variables corresponding to the workbook, a worksheet, and a cell, wherein the set variables comprises a first workbook, a first worksheet, and a first cell,
reading the variables for the first workbook, the first worksheet, and the first cell,
inserting the variables into the database representation,
determining whether additional cells have to be analyzed,
in response to determining that additional cells have to be analyzed, setting the variable corresponding to the first cell to a second cell,
reading the variable of the second cell,
in response to determining that no additional cells have to be analyzed, determining whether additional worksheet have to be analyzed,
in response to determining the additional worksheet have to be analyzed, setting the variable corresponding to the first worksheet to a second worksheet,
reading the variable for the second worksheet,
in response to determining that no additional worksheet have to be analyzed, determining whether additional workbooks have to be analyzed,
in response to determining that additional workbooks have to be analyzed, setting the variable corresponding to the first workbook to a second workbook,
reading the variable of the second workbook;
performing the received query on the database representation of the workbook to create a query result; and
responding to the query with the query result.

16. A system for exposing and utilizing a workbook as a first server data source, the system comprising:
a first client computer configured to execute a spreadsheet application program for authoring the workbook comprising at least one worksheet having at least one cell and at least one reference to at least one second data source, the spreadsheet application program being further configured to publish the workbook to a server computer configured to execute a server program for exposing the workbook as the first server data source and for receiving and responding to query requests directed to a workbook data source;
a second client computer configured to execute an application program for issuing queries against the first server data source, the server program being further configured to receive and respond to a database query from the second client computer to the first server data source, wherein the server program being configured to respond to the database query from the second client computer comprises the server program being configured to:
retrieve from the at least one second data source the data necessary to calculate the workbook,
calculate the workbook,
generate a cube corresponding to the calculated workbook, the cube comprising at least one of the following: a first dimension associated with at least one row in a first worksheet, a second dimension associated with at least one column in the first worksheet, a third dimension associated with a second worksheet, and a fourth dimension associated with the at least one second data source wherein generating the cube comprises:
setting variables corresponding to the workbook, a worksheet and a cell, wherein the set variables comprises a first workbook, a first worksheet, and a first cell,
reading the variables for the first workbook, the first worksheet, and the first cell,
inserting the variables into the cube,
determining whether additional cells have to be analyzed,
in response to the determining that additional cells have to be analyzed, set the variable corresponding to the first cell to a second cell,
reading the variable of the second cell,
in response to the determining that no additional cells have to be analyzed, determining whether additional worksheets have to be analyzed,
in response to the determining that additional worksheets have to be analyzed, set the variable corresponding to the first worksheet to a second worksheet,
reading the variable of the second worksheet,
in response to the determining that no additional worksheets have to be analyzed, determining whether additional workbooks have to be analyzed,
in response to the determining that additional workbooks have to be analyzed, set the variable corresponding to the first workbook to a second workbook,
reading the variable of the second workbook,
analyzing a first data contained within the workbook, wherein analyzing the first data comprises identifying a second data corresponding to the first data, the second data describing at least one of the following: measures, a predefined hierarchy indicating a structure of the first data, and default aggregations indicating a content for data fields, and
using the second data, at least one workbook variable, at least one worksheet variable, and at least one cell variable to map a third data from the calculated workbook to the cube,
perform the received query on the cube to produce a query result including:
determine whether the workbook contains a reference to a data source,
in response to the determination that the workbook contains a reference to the data source, retrieve from the data source the third data necessary to calculate the workbook, and
recalculate the workbook utilizing the third data retrieved from the data source, and transmit the query result to the second client computer in response to the database query;
the spreadsheet application program being configured to determine if a user has made a request to edit the second data; and in response to the determination that the user has made a request to edit the second data, the spreadsheet application program being further configured to:
provide a facility for editing the second data, wherein editing the second data comprises defining a subset of the cube, and
receive the second data edited by the user.

17. The system of claim 16, wherein the spreadsheet application program is further configured to generate and store metadata within the workbook, the metadata being available to a server computer for responding to requests for the workbook data source.

18. The system of claim 16, wherein the application executing on the second client computer comprises an OLAP client application.

* * * * *